US010249896B2

(12) United States Patent
Kwon et al.

(10) Patent No.: US 10,249,896 B2
(45) Date of Patent: Apr. 2, 2019

(54) SYSTEM AND METHOD FOR CONTROLLING FUEL CELL VEHICLE

(71) Applicants: Hyundai Motor Company, Seoul (KR); Kia Motors Corporation, Seoul (KR)

(72) Inventors: Soon Woo Kwon, Yongin-si (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 15/645,031

(22) Filed: Jul. 10, 2017

(65) Prior Publication Data

US 2018/0166719 A1 Jun. 14, 2018

(30) Foreign Application Priority Data

Dec. 10, 2016 (KR) .................. 10-2016-0168083

(51) Int. Cl.
| | | |
|---|---|---|
| *H01M 8/04992* | (2016.01) | |
| *H01M 8/0432* | (2016.01) | |
| *H01M 8/0438* | (2016.01) | |
| *H01M 8/04537* | (2016.01) | |
| *H01M 8/04828* | (2016.01) | |

(Continued)

(52) U.S. Cl.
CPC ..... *H01M 8/04992* (2013.01); *B60L 11/1881* (2013.01); *H01M 8/0485* (2013.01); *H01M 8/04358* (2013.01); *H01M 8/04388* (2013.01); *H01M 8/04395* (2013.01); *H01M 8/04522* (2013.01); *H01M 8/04529* (2013.01); *H01M 8/04552* (2013.01); *H01M 8/04589* (2013.01); *H01M 2250/20* (2013.01); *Y02T 90/32* (2013.01); *Y02T 90/34* (2013.01)

(58) Field of Classification Search
CPC ......... H01M 8/04992; H01M 8/04522; H01M 8/0485; H01M 8/04552; H01M 8/04529; H01M 8/04589; H01M 8/04358; H01M 8/04395; H01M 8/04388; B60L 11/1881
See application file for complete search history.

(56) References Cited

U.S. PATENT DOCUMENTS

| | | |
|---|---|---|
| 7,285,344 B2 | 10/2007 | Imamura et al. |
| 8,405,399 B2 | 3/2013 | Zhang et al. |
| 8,795,908 B2 | 8/2014 | Kaito |

(Continued)

FOREIGN PATENT DOCUMENTS

| | | |
|---|---|---|
| JP | 2007087686 A | 4/2007 |
| JP | 2009129760 A | 6/2009 |

(Continued)

*Primary Examiner* — Stewart A Fraser
(74) *Attorney, Agent, or Firm* — Slater Matsil, LLP

(57) ABSTRACT

A method for controlling a fuel cell vehicle includes acquiring a state data, deriving a mathematical voltage model by substituting the acquired state data into a voltage calculation formula, measuring a voltage of a fuel cell, approximating a mathematical voltage model to a measurement voltage and deriving the reaction area data when the mathematical voltage model approximates the measurement voltage, and controlling the system of the fuel cell vehicle based on the derived reaction area data to eliminate or prevent an over-humidification situation of the fuel cell.

17 Claims, 2 Drawing Sheets

(51) Int. Cl.
*B60L 11/18* (2006.01)
*H01M 8/04492* (2016.01)

(56) References Cited

U.S. PATENT DOCUMENTS

| | | | |
|---|---|---|---|
| 2009/0286109 A1 | 11/2009 | Araki | |
| 2012/0148927 A1 | 6/2012 | Jeon et al. | |
| 2012/0178007 A1* | 7/2012 | Cai | H01M 8/04291 |
| | | | 429/431 |
| 2013/0157161 A1* | 6/2013 | Matsusue | H01M 8/04291 |
| | | | 429/442 |
| 2016/0149240 A1 | 5/2016 | Won et al. | |
| 2017/0250416 A1* | 8/2017 | Watanabe | H01M 8/04179 |

FOREIGN PATENT DOCUMENTS

| | | |
|---|---|---|
| JP | 2012089448 A | 5/2012 |
| JP | 2014068437 A | 4/2014 |
| JP | 2014082082 A | 5/2014 |
| KR | 101293961 B1 | 8/2013 |
| KR | 20140036664 A | 3/2014 |
| KR | 20160062618 A | 6/2016 |

* cited by examiner

SYSTEM AND METHOD FOR CONTROLLING FUEL CELL VEHICLE

CROSS-REFERENCE TO RELATED APPLICATIONS

The present application claims priority to Korean Patent Application No. 10-2016-0168083, filed on Dec. 10, 2016, the entire contents of which is incorporated herein for all purposes by this reference.

TECHNICAL FIELD

The present invention relates to a system and a method for controlling a fuel cell vehicle.

BACKGROUND

As output power generated by a fuel cell at the time of driving in the state where a vehicle is degraded (aged) is decreased, power performance is decreased. In particular, a vehicle is momentarily accelerated when entering a highway, and thus has a trouble in adjusting to a speed flow of other vehicles, such that driver's safety may be at risk.

The fuel cell vehicle hybridizes a fuel cell as a main power source and a high voltage battery as a secondary power source to improve fuel efficiency and power performance. For the development of the fuel cell vehicle, the optimum power distribution is performed before the fuel cell ages. Therefore, if the fuel cell is degraded and thus aged, the fuel cell is out of the optimum power distribution.

In order to maintain the optimum power distribution, a technique for estimating the degradation in the fuel cell is indispensable. In the case of reversible degradation, the difference in relative humidity between atmospheric temperature at a low temperature region and atmospheric temperature at a high temperature region is great, and a water content in the fuel cell greatly varies depending on a driving history. In particular, the difference in performance greatly varies depending on whether generated water due to a reaction of hydrogen and oxygen is discharged in the air or whether the generated water is contained in the fuel cell. The performance of the fuel cell is degraded regardless of the excessive water content or the insufficient water content in the fuel cell, and the performance of the fuel cell is best when the relative humidity is maintained at 100%. A water content estimator is required to prevent the performance degradation depending on the water content in the fuel cell.

The degradation measurement method needs to measure the degradation in real time in order to be applied to a real vehicle, but a sensor capable of measuring the irreversible degradation is not present. To estimate the reversible degradation, a relative humidity sensor needs to be equipped in the vehicle. In this case, however, costs may be increased due to the relative humidity sensor. Therefore, there is a need to develop the estimator that may estimate the reversible degradation and the irreversible degradation of the fuel cell in real time in the vehicle.

The matters described as the related art have been provided only for assisting in the understanding for the background of the present invention and should not be considered as corresponding to the related art known to those skilled in the art.

SUMMARY

Embodiments of the present invention provide a system and a method for controlling a fuel cell vehicle capable of driving the vehicle with optimum power distribution even when a fuel cell is reversibly or irreversibly degraded and driving the vehicle while optimally maintaining a water content in the fuel cell to contribute to power performance and an increase in fuel efficiency.

According to an exemplary embodiment of the present invention, a method can used for controlling a fuel cell vehicle. A state data including a water content of a membrane electrode assembly, a cathode pressure, an anode pressure, a cooling water temperature, and a stack current is acquired. A mathematical voltage model is derived by substituting the acquired state data into a voltage calculation formula. A voltage of a fuel cell is measured and a mathematical voltage model is approximated to a measurement voltage by changing a reaction area data and deriving the reaction area data when the mathematical voltage model approximates the measurement voltage. The system of the fuel cell vehicle is controlled based on the derived reaction area data to eliminate or prevent an over-humidification situation of the fuel cell, thereby optimizing performance of the fuel cell.

The water content of the membrane electrode assembly may be estimated from relative humidity at an air outlet of the fuel cell stack.

The mathematical voltage model and the measurement voltage may be a graph in which a current density is represented on an X axis and a cell voltage is represented on a Y axis.

The voltage calculation formula may be a formula using a reaction area data as a parameter, and in the deriving of the mathematical voltage model, the mathematical voltage model may be derived by substituting an initial value of the reaction area data and in the deriving of the reaction area data, the mathematical voltage model may approximate the measurement voltage by substituting the reaction area data input to the voltage calculation formula while changing the reaction area data.

In the optimizing of the performance of the fuel cell, when a deviation between a plurality of cell voltages is equal to or greater than a reference level, the system of the fuel cell vehicle may be controlled on the basis of the water content of the membrane electrode assembly to solve or prevent a drying state of the fuel cell.

In the optimizing of the performance of the fuel cell, when the deviation between the plurality of cell voltages is equal to or less than the reference level, the system of the fuel cell vehicle may be controlled on the basis of the reaction area data to solve or prevent the over-humidification state of the fuel cell.

In the optimizing of the performance of the fuel cell, when a dispersion value between a plurality of cell voltages is equal to or less than a first reference level, the system of the fuel cell vehicle may be controlled on the basis of the water content of the membrane electrode assembly to solve or prevent a drying state of the fuel cell.

In the optimizing of the performance of the fuel cell, when a cell voltage ratio obtained by dividing a minimum cell voltage by an average cell voltage is equal to or greater than a second reference value, the system of the fuel cell vehicle may be controlled on the basis of the water content of the membrane electrode assembly to solve or prevent a drying state of the fuel cell.

The method may further include approximating a mathematical voltage model to a measurement voltage by changing a catalyst supporting amount data and deriving the catalyst supporting amount data when the mathematical voltage model approximates the measurement voltage, in which in the optimizing of the performance of the fuel cell, the system of the fuel cell vehicle may be controlled on the basis of the derived catalyst supporting amount data.

In the optimizing of the performance of the fuel cell, when the system of the fuel cell vehicle is controlled on the basis of the derived reaction area data, a temperature, an air supply amount, or a hydrogen purge amount of the fuel cell may be controlled and when the system of the fuel cell vehicle is controlled on the basis of the derived catalyst supporting amount data, a power distribution between the high voltage battery and the fuel cell of the vehicle may be controlled.

The method may further include: approximating a mathematical voltage model to a measurement voltage by changing an internal current density data and deriving the internal current density data when the mathematical voltage model approximates the measurement voltage, in which in the optimizing of the performance of the fuel cell, the system of the fuel cell vehicle may be controlled on the basis of the derived internal current density data.

According to another exemplary embodiment of the present invention, a system can control a fuel cell vehicle for performing the method for controlling a fuel cell vehicle. A sensor is configured to measure a pressure of a cathode and an anode. A sensor is configured to measure cooling water temperature. A sensor is configured to measure a current of a fuel cell stack. A controller is configured to acquire a state data including a water content of a membrane electrode assembly, a cathode pressure, an anode pressure, a cooling water temperature, and a stack current, derive a mathematical voltage model by substituting the acquired state data into a voltage calculation formula, measure a voltage of the fuel cell, approximate a mathematical voltage model to a measurement voltage by changing a reaction area data, derive the reaction area data when the mathematical voltage model approximates the measurement voltage, and control the system of the fuel cell vehicle based on the derived reaction area data to eliminate or prevent an over-humidification situation of the fuel cell to thereby optimize the performance of the fuel cell.

DETAILED DESCRIPTION OF ILLUSTRATIVE EMBODIMENTS

Figure 1:
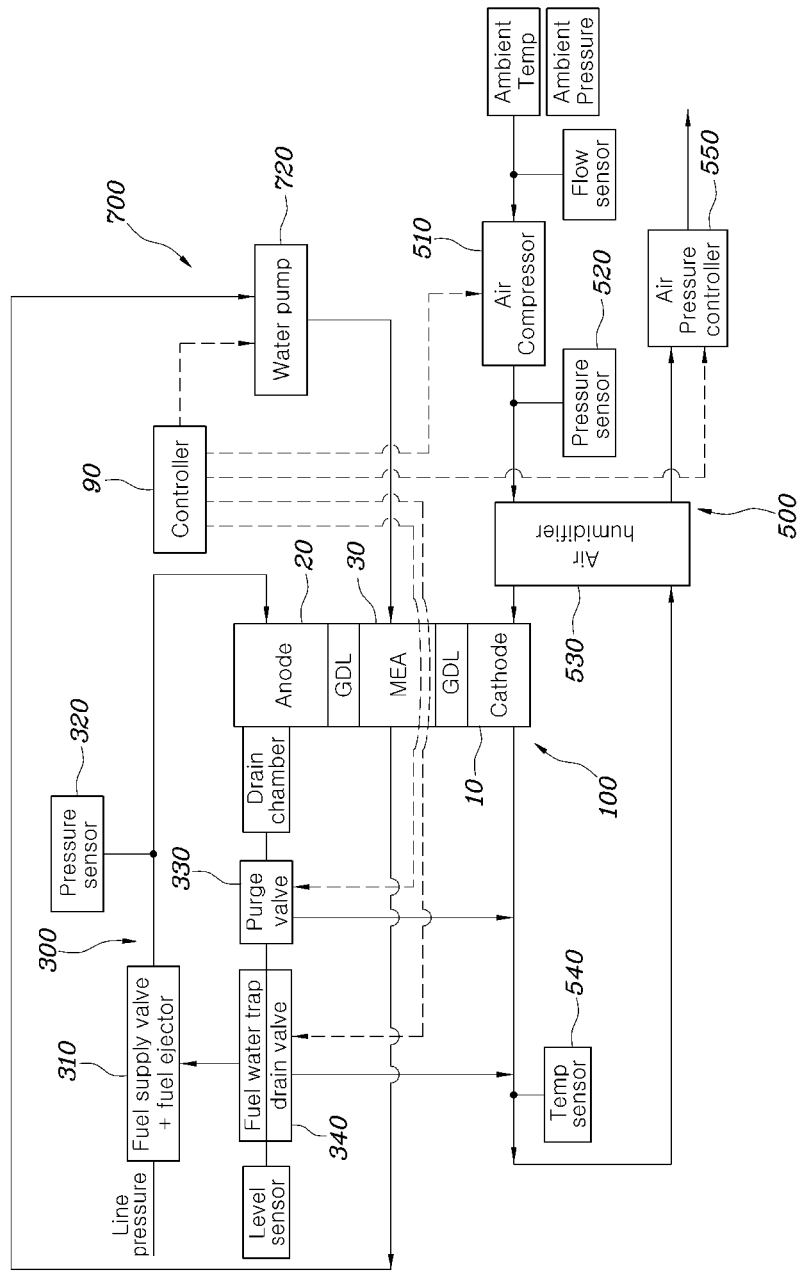
FIG. 1 is a configuration diagram of a system for controlling a fuel cell vehicle according to an exemplary embodiment of the present invention.
Figure 2:
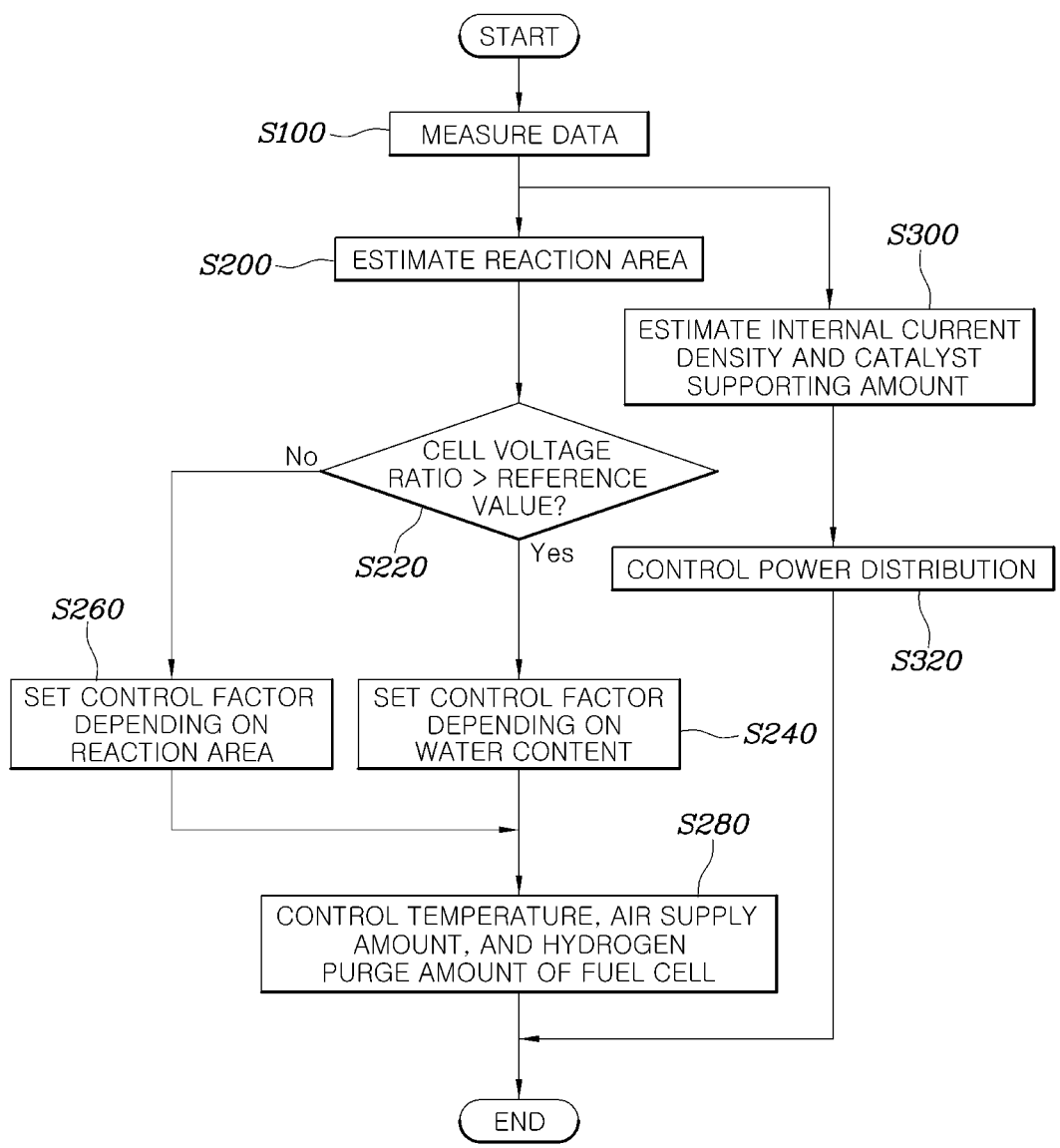
FIG. 2 is a flow chart of a method for controlling a fuel cell vehicle according to an exemplary embodiment of the present invention.

FIG. 1 is a configuration diagram of a system for controlling a fuel cell vehicle according to an exemplary embodiment of the present invention and FIG. 2 is a flow chart of a method for controlling a fuel cell vehicle according to an exemplary embodiment of the present invention.

A method for controlling a fuel cell vehicle according to the present invention includes acquiring a state data including a water content of a membrane electrode assembly, a cathode pressure, an anode pressure, a cooling water temperature, and a stack current (S100); deriving a mathematical voltage model by substituting the acquired state data into a voltage calculation formula; measuring a voltage of a fuel cell; approximating a mathematical voltage model to a measurement voltage by changing a reaction area data and deriving the reaction area data when the mathematical voltage model approximates the measurement voltage (S200); and controlling the system of the fuel cell vehicle based on the derived reaction area data to eliminate or prevent an over-humidification situation of the fuel cell to thereby optimize performance of the fuel cell.

The degradation in the fuel cell may be classified into a reversible degradation and an irreversible degradation, each of which may be divided into two kinds.

In the case of the reversible degradation, performance may be recovered but the reversible degradation mostly occurs when water mainly generated by a fuel cell reaction is not discharged or is discharged too much and thus a water amount is lacking. A method for coping with the problem performs a driving temperature control, an air supply amount control, or the like to control the water amount.

In the case of the irreversible degradation, performance may not be recovered, but the amount of a catalyst dispersed for a chemical reaction is decreased or a hole of a hydrogen ion electrolyte membrane is formed to cause a hydrogen crossover. As a result, since the power of the fuel cell is decreased, a power distribution control of the overall power system is required so that the high voltage battery supplies a larger amount of power than the fuel cell.

Typically, the selection of parameters that may understand a kind and a degree of the degradation and the estimation of values thereof are not entirely satisfactory and thus a proper control is not implemented. In particular, it is difficult to distinguish a dry operation state (dry out) and an over-humidification operation state during the reversible degradation.

In order to solve the problem, the present invention proposes a method for founding out values of an appropriate parameter by comparing a mathematical estimation model of an output voltage of a fuel cell with an actual model, obtaining optimum efficiency by controlling the fuel cell system based on the values, and preventing a degradation in the fuel cell.

Specifically, FIG. 2 is a flowchart of a method for controlling a fuel cell according to an exemplary embodiment of the present invention. First, the method performs the acquiring of the state data including the water content of the membrane electrode assembly, the cathode pressure, the anode pressure, and the cooling water temperature, and the stack current (S100). The water content of the membrane electrode assembly indicates how much water is present in the membrane electrode assembly, which may be known based on a relative humidity of a cathode outlet of the fuel cell Since the water content of the membrane electrode assembly is proportional to the relative humidity, the moisture content may be derived simply by being multiplied by a constant or by memorizing the Formula in advance and by inputting the relative humidity to the above Equation The relative humidity of the cathode outlet may also be measured with the sensor and may be estimated by the same manner as KR 10-1293961 B1.

The cathode pressure and the anode pressure may be measured with a sensor as illustrated in FIG. 1, and the cooling water temperature may be measured in a cooling water line circulating the fuel cell. Further, the stack current may be measured by a current sensor.

The deriving of the mathematical voltage model by substituting the so obtained state data into the voltage calculation formula is performed.

The voltage calculation formula indicates a formula obtained by indirectly calculating the voltage output from the fuel cell with various input values. In the voltage calculation formula, the mathematical voltage $V_m$ is calculated by subtracting an activation loss Vact, a resistance loss Vohm, and a concentration loss Vcon from a lossless thermodynamic theoretical voltage E as the following Formula 1. The activation loss is a loss that occurs to lower activation energy for triggering the reaction, and the resistance loss is a loss that occurs by a migration resistance of ions in the electrolyte and a migration resistance of electrons in an electrode, a gas diffusion layer, and a separator. The concentration loss is a loss that is caused by a lack of ability to maintain an average initial concentration of a fluid as a reactant is consumed at the electrode by an electrochemical reaction.

$$V_m = \frac{-\Delta G}{2F} + \frac{R_u T}{nF} \ln\left(\frac{\left(\frac{P_a - \phi P_{H_2O\_sat}}{P_a^0}\right)\left(\frac{P_c - \phi P_{H_2O\_sat}}{P_c^0}\right)^{0.5}}{a_{H_2O}}\right) - $$

$$\frac{R_u T}{\alpha n F} \ln\left(\frac{i + i_{in}}{i_{0,ret} A_c L_c \left(\frac{P_c - \phi P_{H_2O\_sat}}{P_c^0}\right)^{0.5} e^{\frac{E_c}{R}\left(\frac{1}{T} - \frac{1}{298.15}\right)}}\right) -$$

$$(i + i_{in}) \left(R_a + \frac{t_m}{0.005139(0.043 + 17.81\phi - 39.85\phi^2 + 36\phi^3) - 0.00326} e^{1268\left(\frac{1}{T} - \frac{1}{303}\right)}\right) +$$

$$d \frac{R_u T}{nF} \ln\left(1 - \frac{i + i_{in}}{D_{0,ret} \frac{T^{0.5}}{T_0^{1.5}} \left(\frac{P_c - \phi P_{H_2O\_sat}}{P_c^0}\right)}\right)$$

$$I = \frac{I_{FO}}{A_c}$$

[Formula 1]

P: pressure, kPa
$P_{sat}$: saturation pressure, kPa
F: Faraday's constant, 96,487 C/mol
$R_u$: universal gas constant, 8.314 J/mol/K
T: temperature, K
$T_c$: temperature, °C
E: ideal cell potential, V
R: resistance
i: current density, (A/cm2)
D: diffusivity
$A_C$: catalyst specific area
$L_C$: catalyst loading
$E_c$: activation energy, 66 kJ/mol
V: potential, V
d: concentration coefficient
n: number of electron per molecule of hydrogen,2
$i_{in}$: internal current density, (A/cm2)
$i_L$: limiting current density. (A/cm2)
$t_m$: thickness of membrane
$K_m$: ion conductance of membrane
$P_a$: pressure of anode
$P_c$: pressure of cathod
$a_{H2O}$: activity of water
$P_{H2O\_Sat}$: saturated water vapor pressure
$R_m$: resistance of membrane
$R_a$: resistance of rest of cell
F: Faraday constant, 96487 (C/mol)
G: Gibb's free energy, (J)
Φ: relative humidity
α: transfer coefficient
a: water activity
t: thickness
δ: diffusion distance
ε: porosity
λ: percentage of water content of membrane
Subscripts
H2: hydrogen
O2: oxygen
H2O: water
ref: reference condition (298.15 K. 101.25 kPa)
m: membrane When the measured or estimated state data are substituted into the above Formula 1, a voltage value Vm for a specific current density i may be obtained, in which the voltage value is formed into a graph form in which a current density is represented on an X axis and a cell voltage is represented on a Y axis to derive a mathematical voltage model.

The above Formula includes several parameters, which are a reaction area data Ac, a catalyst supporting amount data Lc, and an internal current density iin. Therefore, the rest parameters are fixed to an initially substituted value, only one of the rest parameters is variously changed and substituted to make the mathematical voltage model and the graph form of the measurement voltage similar, and the parameter values when the mathematical voltage model and the graph form of the measurement voltage are similar becomes parameter values that we want to obtain. The reaction area data Ac and the catalyst supporting amount data Lc are derived by the graph fitting method.

First, the approximating of the mathematical voltage model to the measurement voltage by changing the reaction area data and deriving the reaction area data when the mathematical voltage model approximates the measurement voltage (S200) are performed. To make the voltage obtained by varying the reaction area data more accurate, the voltage needs to be obtained based on a minimum cell voltage That is, in the case of the mathematical voltage model derived by changing the reaction area data, a mathematical voltage model for the minimum cell voltage is obtained, and the comparison target defines the actually measured minimum cell voltage as the measurement voltage to derive the reaction area data.

Further, the system of the fuel cell vehicle is controlled on the basis of the derived reaction area data to eliminate or prevent the over-humidification state of the fuel cell, thereby optimizing the performance of the fuel cell.

When an operating temperature of the fuel cell is low, a saturated water vapor pressure is low and the generated water that is a resultant of a hydrogen oxygen reaction exists in a liquid state instead of vapor to be adsorbed to the channel wall or the gas diffusion layer. As a result, the generated water is not discharged well in the air according to an air flow, and therefore occurs when being accumulated in the fuel cell over time. If the generated water exceeds the maximum water content of the electrolyte membrane and the gas diffusion layer while being accumulated in the fuel cell, the generated water overflows to a hydrogen and oxygen flow channel. As a result, a resistance of a path through which hydrogen and oxygen are transferred to a catalyst is increased (hereinafter, referred to as excessive water). To connect the phenomenon to the mathematical voltage model, the reaction area is set as a parameter. When the excessive water is present, the generated water covers an electrode surface, which is a result analyzed by the same effect as reducing the reaction area. Accordingly, when the reaction area is increased, it is assumed that water is excessive. A control to gradually increase the temperature of the fuel cell, increase an air supply amount, or increase a hydrogen purge amount in proportion to the degree of the excessive water is performed (S260 and S280).

Therefore, it is possible to accurately diagnose the over-humidification state of the fuel cell stack by the control, and drive the fuel cell with the optimum efficiency and prevent the degradation in the fuel cell by accurately knowing and coping with the over-humidified degree of humidification.

Meanwhile, in the optimizing of the performance of the fuel cell, when the deviation between the plurality of cell voltages is equal to or greater than the reference level, the system of the fuel cell vehicle may be controlled on the basis of the water content of the membrane electrode assembly to solve or prevent the drying state of the fuel cell. Further, in the optimizing of the performance of the fuel cell, when the deviation between the plurality of cell voltages is equal to or less than the reference level, the system of the fuel cell vehicle may be controlled on the basis of the reaction area data to solve or prevent the over-humidification state of the fuel cell.

For example, in the optimizing of the performance of the fuel cell, when a dispersion value of the plurality of cell voltages is equal to or less than a first reference value, the system of the fuel cell vehicle may be controlled on the basis of the water content of the membrane electrode assembly to solve or prevent the drying state of the fuel cell. The small dispersion value of the cell voltage means that the deviation between the cell voltages is small and relatively uniform, which corresponds to the drying or normal state rather than the over-humidification. Accordingly, in this case, as the water content is decreased, the fuel cell is cooled or the air supply amount is reduced depending on the water content of the membrane electrode assembly or the relative humidity, thereby preventing the drying state and driving the fuel cell in an optimum state.

As another method, in the optimizing of the performance of the fuel cell, when the cell voltage ratio obtained by dividing the minimum cell voltage by an average cell voltage is equal to or greater than a second reference value, the system of the fuel cell vehicle is controlled on the basis of the water content of the membrane electrode assembly to solve or prevent the drying state of the fuel cell. The cell voltage ratio is a value obtained by dividing the minimum cell voltage by the average cell voltage. Here, the larger the cell voltage ratio, the smaller the deviation between the cell voltages. Therefore, considering the cell voltage ratio instead of the dispersion value may also have the same meaning. In this case, it is assumed that the fuel cell is in the normal state or in the drying state when the cell voltage ratio is also large, and therefore the system of the fuel cell vehicle may be controlled on the basis of the water content of the membrane electrode assembly or the relative humidity to solve or prevent the drying state of the fuel cell (S220, S240, and S280).

In addition, the approximating of the mathematical voltage model to the measurement voltage by changing the catalyst supporting amount data and the deriving of the catalyst supporting amount data when the mathematical voltage model approximates the measurement voltage (S300) are performed and in the optimizing the performance of the fuel cell (S320), the system of the fuel cell vehicle may be controlled on the basis of the derived catalyst supporting data. To make the voltage obtained by varying the catalyst supporting amount data more accurate, the voltage needs to be obtained based on the average cell voltage. That is, in the case of the mathematical voltage model derived by changing the catalyst supporting amount data, a mathematical voltage model for the average cell voltage is obtained, and the comparison target defines the actually measured average cell voltage as the measurement voltage to derive the catalyst supporting amount data.

As described above, in the optimizing of the performance of the fuel cell, when the system of the fuel cell vehicle is controlled on the basis of the derived reaction area data, a temperature, an air supply amount, or a hydrogen purge amount of the fuel cell is controlled (S280) and when the system of the fuel cell vehicle is controlled on the basis of the derived catalyst supporting amount data, the power distribution between the high voltage battery and the fuel cell of the vehicle may be controlled (S320).

When the catalyst supporting amount is decreased, the catalyst itself may be irreversibly degraded, and may be reversibly degraded by being momentarily wrapped with moisture. Therefore, in this case, it is appropriate to more use power through the high voltage battery and reduce the burden on the fuel cell.

Meanwhile, additionally, the approximating of the mathematical voltage model to the measurement voltage by changing the internal current density data and the deriving of the internal current density data when the mathematical voltage model approximates the measurement voltage (S300) are performed and in the optimizing of the performance of the fuel cell, the system of the fuel cell vehicle may be controlled on the basis of the derived internal current density data (S320).

The internal current density is obtained by converting the amount of hydrogen ions to directly crossover to the cathode by passing through the membrane electrode assembly into a current density unit and may occur when a pin hole is formed in the membrane electrode assembly. Therefore, the degradation degree of the fuel cell may be understood based on the degree of the internal current density and thus, the output through the high voltage battery is used more and the burden on the fuel cell is reduced, thereby preventing the degradation in the fuel cell.

In addition, in order to understand the internal current density or the catalyst supporting amount as parameters, when the average cell voltage value is used as the measurement voltage and the reaction area is used as the parameter, it is preferable to use the minimum cell voltage as the measurement voltage.

As a result, according to the exemplary embodiment of the present invention, it is possible to understand whether the performance degradation of the fuel cell is due to the degradation in the catalyst, the water content, or a combination thereof, and in each case, the fuel cell may be recovered quickly by controlling the water content or increasing the usage of the high voltage battery and optimally driven in the optimum state under the present situation.

The system for controlling a fuel cell vehicle of FIG. 1 for performing the method for controlling a fuel cell vehicle of the present invention includes: a sensor configured to measure a pressure of a cathode and an anode; a sensor configured to measure cooling water temperature; a sensor configured to measure a current of a fuel cell stack; and a controller configured to acquire a state data including a water content of a membrane electrode assembly, a cathode pressure, an anode pressure, a cooling water temperature, and a stack current, derive a mathematical voltage model by substituting the acquired state data into a voltage calculation formula, measure a voltage of the fuel cell, approximate a mathematical voltage model to a measurement voltage by changing a reaction area data, derive the reaction area data when the mathematical voltage model approximates the measurement voltage, and control the system of the fuel cell vehicle based on the derived reaction area data to eliminate or prevent an over-humidification situation of the fuel cell to thereby optimize the performance of the fuel cell.

The fuel cell 100 is configured to include an anode 20, a cathode 10 and a membrane electrode assembly (MEA), in which the anode 20 is connected to a hydrogen line 300, the cathode 10 is connected to an air line 500, and a cooling line 700 circulates the whole of the fuel cell 100. The hydrogen line 300 is provided with a supply valve 310, a pressure sensor 320, a purge valve 330 and a drain valve 340 and the air line 500 is provided with a humidifier 530, a pressure sensor 520, a compressor 510, a flow rate valve 550, and a temperature sensor 540. Further, the cooling line 700 is provided with a pump 720.

The controller 900 acquires the state data including the cathode pressure, the anode pressure, the cooling water temperature, and the stack current from the sensor measuring the pressure of the cathode and the anode, the sensor measuring the cooling water temperature, and the sensor measuring the current of the fuel cell stack, and estimates the water content of the membrane electrode assembly.

Further, the mathematical voltage model is derived using the voltage calculation formula stored in a separate memory, the reaction area data is obtained by approximating the mathematical voltage model to the measurement voltage, and the system of the fuel cell vehicle is controlled on the basis of the reaction area data to solve or prevent the over-humidification state of the fuel cell, thereby optimizing the performance of the fuel cell.

According to the system and method for controlling a fuel cell vehicle according to the exemplary embodiment of the present invention, it is possible to drive the vehicle with optimum power distribution even when a fuel cell is reversibly or irreversibly degraded and drive the vehicle while optimally maintaining a water content in the fuel cell, thereby contributing to power performance and an increase in fuel efficiency.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for controlling a fuel cell vehicle, the method comprising:
   acquiring state data that includes information related to a water content of a membrane electrode assembly, a cathode pressure, an anode pressure, a cooling water temperature, and a stack current;
   deriving a mathematical voltage model by substituting the acquired state data into a voltage calculation formula;
   measuring a voltage of a fuel cell;
   approximating the mathematical voltage model to a measurement voltage by changing a reaction area data and deriving the reaction area data when the mathematical voltage model approximates the measurement voltage; and
   controlling a system of the fuel cell vehicle based on the derived reaction area data to affect an over-humidification situation of the fuel cell.

2. The method of claim 1, wherein controlling the system of the fuel cell vehicle comprises controlling a system of the fuel cell vehicle based on the derived reaction area data to eliminate or prevent an over-humidification situation of the fuel cell.

3. The method of claim 1, wherein the water content of the membrane electrode assembly is estimated from relative humidity at an air outlet of the fuel cell.

4. The method of claim 1, wherein the mathematical voltage model and the measurement voltage are a graph in which a current density is represented on an X axis and a cell voltage is represented on a Y axis.

5. The method of claim 1, wherein the voltage calculation formula is a formula using a reaction area data as a parameter, and in the deriving of the mathematical voltage model, the mathematical voltage model is derived by substituting an initial value of the reaction area data and in the deriving of the reaction area data, the mathematical voltage model approximates the measurement voltage by substituting the reaction area data input to the voltage calculation formula while changing the reaction area data.

6. The method of claim 1, wherein, when a deviation between a plurality of cell voltages is equal to or greater than a reference level, the system of the fuel cell vehicle is controlled on the basis of the water content of the membrane electrode assembly to solve or prevent a drying state of the fuel cell.

7. The method of claim 6, wherein, when the deviation between the plurality of cell voltages is equal to or less than the reference level, the system of the fuel cell vehicle is controlled on the basis of the reaction area data to solve or prevent an over-humidification state of the fuel cell.

8. The method of claim 1, wherein, when a dispersion value between a plurality of cell voltages is equal to or less than a first reference level, the system of the fuel cell vehicle is controlled on the basis of the water content of the membrane electrode assembly to solve or prevent a drying state of the fuel cell.

9. The method of claim 1, wherein, when a cell voltage ratio obtained by dividing a minimum cell voltage by an average cell voltage is equal to or greater than a second reference value, the system of the fuel cell vehicle is controlled based on the water content of the membrane electrode assembly to solve or prevent a drying state of the fuel cell.

10. The method of claim 1, further comprising approximating a mathematical voltage model to a measurement voltage by changing a catalyst supporting amount data and deriving the catalyst supporting amount data when the mathematical voltage model approximates the measurement voltage, wherein the system of the fuel cell vehicle is controlled on the basis of the derived catalyst supporting amount data.

11. The method of claim 10, wherein, when the system of the fuel cell vehicle is controlled on the basis of the derived reaction area data, a temperature, an air supply amount, or a hydrogen purge amount of the fuel cell is controlled and when the system of the fuel cell vehicle is controlled on the basis of the derived catalyst supporting amount data, a power distribution between a high voltage battery and the fuel cell of the vehicle is controlled.

12. The method of claim 1, further comprising approximating a mathematical voltage model to a measurement voltage by changing an internal current density data and deriving the internal current density data when the mathematical voltage model approximates the measurement voltage, wherein the system of the fuel cell vehicle is controlled on the basis of the derived internal current density data.

13. A system for controlling a fuel cell vehicle, the system comprising:
- a first sensor configured to measure a pressure of a cathode and an anode;
- a second sensor configured to measure cooling water temperature;
- a third sensor configured to measure a current of a fuel cell stack; and
- a controller programmed to
  - acquire state data that includes information related to a water content of a membrane electrode assembly, a cathode pressure, an anode pressure, a cooling water temperature, and a stack current,
  - derive a mathematical voltage model by substituting the acquired state data into a voltage calculation formula,
  - measure a voltage of the fuel cell,
  - approximate a mathematical voltage model to a measurement voltage by changing a reaction area data,
  - derive the reaction area data when the mathematical voltage model approximates the measurement voltage, and
  - control the system of the fuel cell vehicle based on the derived reaction area data to affect an over-humidification situation of the fuel cell.

14. An apparatus comprising:
- a fuel cell that includes an anode, a cathode and a membrane electrode assembly;
- a hydrogen line, wherein the anode is connected to the hydrogen line;
- an air line, wherein the cathode is connected to the air line;
- a cooling line configured to circulate cooling water for the fuel cell;
- a pressure sensor configured to measure a pressure of the anode and the cathode;
- a temperature sensor configured to measure a temperature of the cooling water in the cooling line;
- a current sensor configured to measure a current of the fuel cell; and
- a controller programmed to
  - acquire state data that includes information related to a water content of a membrane electrode assembly, a cathode pressure, an anode pressure, a cooling water temperature, and a stack current,
  - derive a mathematical voltage model by substituting the acquired state data into a voltage calculation formula,
  - measure a voltage of the fuel cell,
  - approximate a mathematical voltage model to a measurement voltage by changing a reaction area data,
  - derive the reaction area data when the mathematical voltage model approximates the measurement voltage, and
  - control the system of the fuel cell vehicle based on the derived reaction area data to affect an over-humidification situation of the fuel cell.

15. The apparatus of claim 14, further comprising a humidifier coupled in line with the air line.

16. The apparatus of claim 14, further comprising:
- a supply valve coupled to the hydrogen line;
- a pressure sensor coupled to the hydrogen line;
- a humidifier coupled in line with the air line;
- a compressor coupled to the air line; and
- a pump coupled to the cooling line.

17. The apparatus of claim 14, further comprising an air outlet of the fuel cell, wherein the water content of the membrane electrode assembly is estimated from relative humidity at the air outlet.

* * * * *